J. R. MITCHELL.
SPRING FRICTION DRAFT GEAR.
APPLICATION FILED OCT. 18, 1915.
1,300,448.
Patented Apr. 15, 1919.
2 SHEETS—SHEET 1.
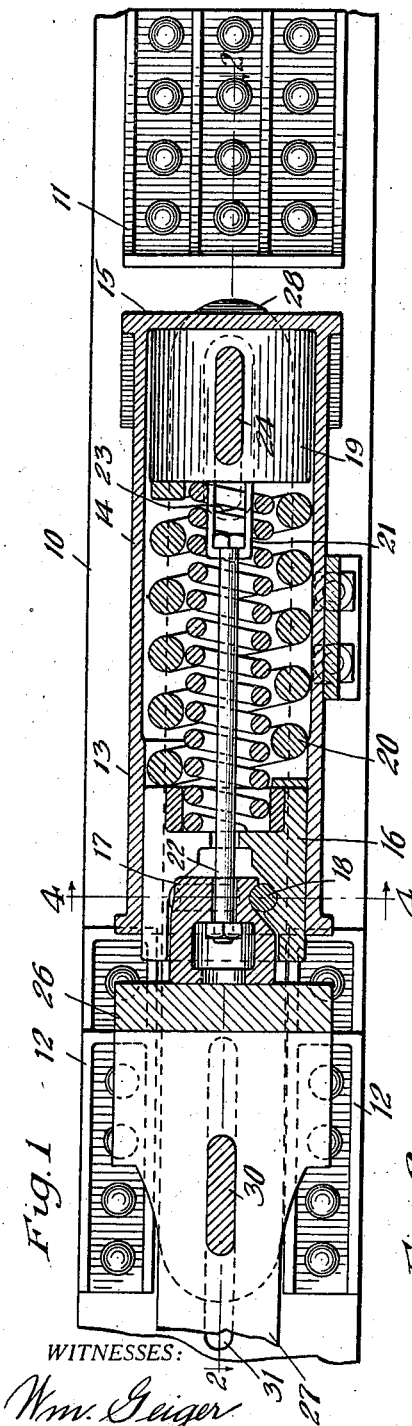
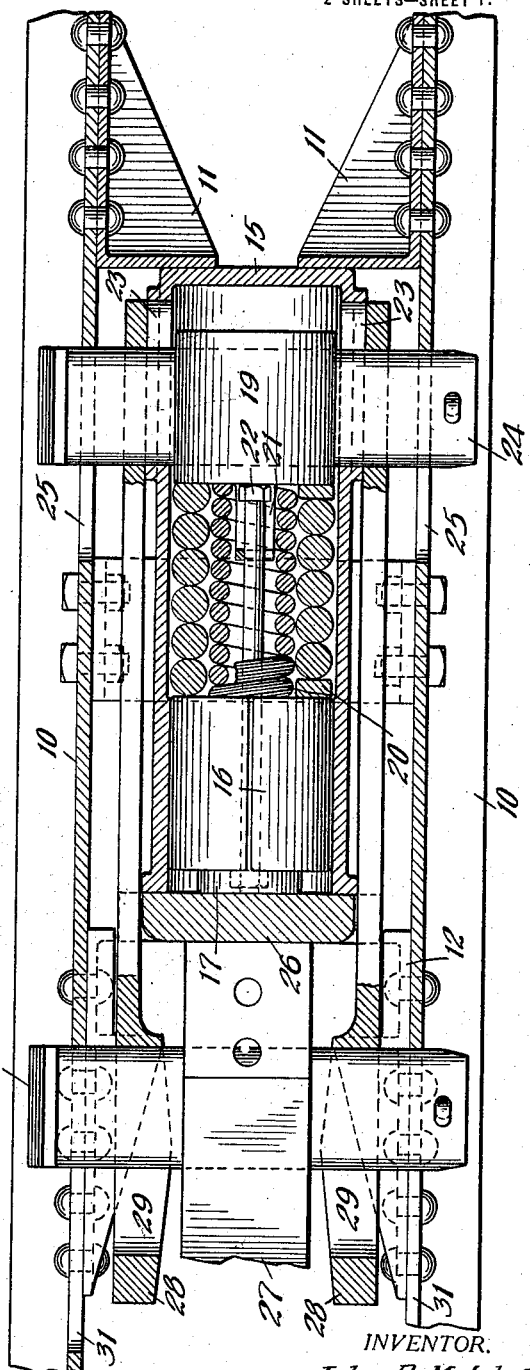
WITNESSES:
INVENTOR.
John R. Mitchell
BY
ATTORNEY J. R. MITCHELL.
SPRING FRICTION DRAFT GEAR.
APPLICATION FILED OCT. 18, 1915.
1,300,448.
Patented Apr. 15, 1919.
2 SHEETS—SHEET 2.
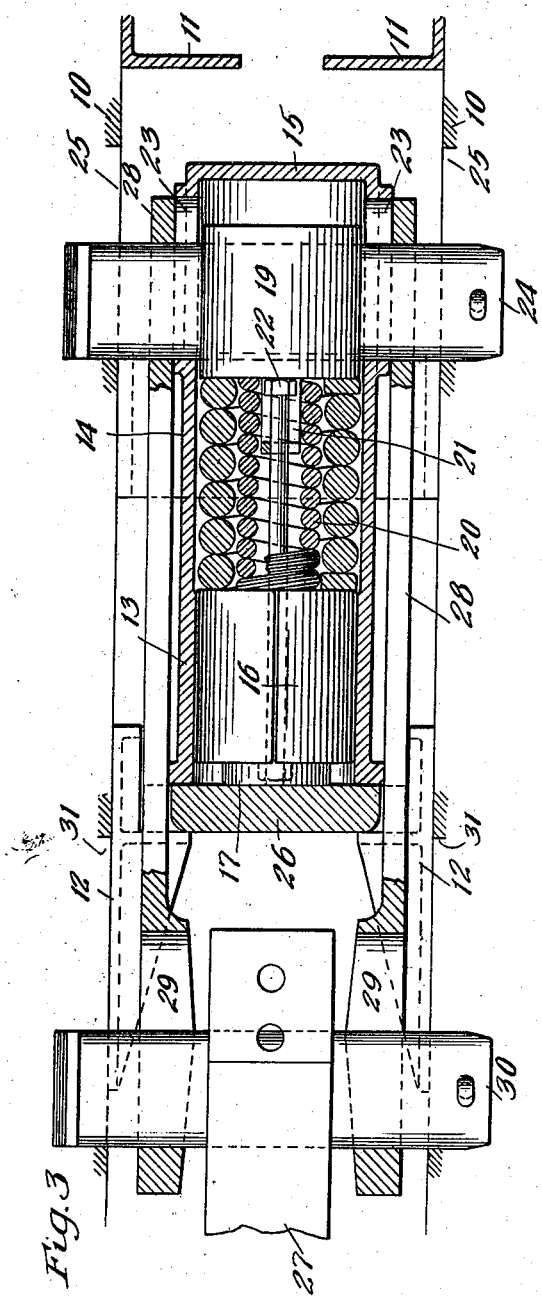
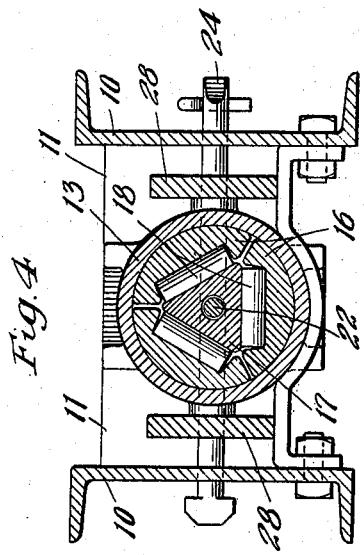
WITNESSES:
INVENTOR.
John R. Mitchell
BY
ATTORNEY

UNITED STATES PATENT OFFICE.

JOHN R. MITCHELL, OF CHICAGO, ILLINOIS, ASSIGNOR TO WILLIAM H. MINER, OF CHAZY, NEW YORK.

SPRING-FRICTION DRAFT-GEAR.

1,300,448.  Specification of Letters Patent.  Patented Apr. 15, 1919.

Application filed October 18, 1915. Serial No. 56,480.

*To all whom it may concern:*

Be it known that I, JOHN R. MITCHELL, a citizen of the United States, residing at Chicago, in the county of Cook and State of Illinois, have invented a certain new and useful Improvement in Spring-Friction Draft-Gears, of which the following is a full, clear, concise, and exact description, reference being had to the accompanying drawings, forming a part of this specification.

This invention relates to improvements in spring friction draft gears.

An object of the invention is to provide a gear for railway draft riggings wherein the action is graduated and has a spring action only during the first portions of the buff and draft movements and a friction action during the latter portions of said movements.

Another object of the invention is to provide a gear of the type above described wherein the same spring, the main spring of the gear, is employed as a cushioning medium when the spring and friction actions occur.

The invention furthermore consists in the improvements in the parts and devices and in the novel combinations of the parts and devices herein shown, described or claimed.

In the drawing forming a part of this specification, Figure 1 is a longitudinal, sectional view of a draft rigging showing my improvement in connection therewith, the parts being illustrated in normal position. Fig. 2 is a horizontal, sectional view taken substantially on the line 2—2 of Fig. 1 but showing the parts under full buff. Fig. 3 is a view similar to Fig. 2 but illustrating the position of the parts under full draft. And Fig. 4 is a transverse, sectional view taken substantially on the line 4—4 of Fig. 1.

In said drawing, 10—10 denote the center or draft sills to the inner sides of which are secured rear stops 11—11 and front stops 12—12. The gear proper, as shown, comprises a combined friction cylinder and spring casing 13—14, the spring casing having an integral rear wall 15 adapted to act as a follower under certain conditions, as hereinafter described. Mounted within the friction cylinder 13 is a plurality of friction shoes 16, wedge 17 and anti-friction rollers 18 interposed between the wedge and shoes. Mounted within the spring casing 14, at the rear end thereof is a block or follower 19, and between the follower 19 and the inner ends of the friction shoes is the main spring 20 of the gear which, as shown, comprises an outer heavy coil and an inner lighter coil. The follower 19 is provided on its forward end with a staple 21 with which is slidably engaged one end of the connecting bolt 22, the opposite end of said bolt extending into the wedge 17. The side walls of the spring casing 14, at the rear thereof, are provided with elongated key slots 23 and the follower 19 is also transversely slotted to receive the key 24, the ends of the latter being slidable forwardly from normal position in slots 25 in the draft members 10. At the front end of the gear, a follower 26 is employed which normally engages the shoulders on the front stops 12, and to operatively connect the gear with the draw-bar 27, I employ side links 28, the latter being suitably slotted to receive the rear key 24 and having elongated slots 29 at the front ends to receive the coupler key 30, the ends of the latter being slidable forwardly and rearwardly from normal position in slots 31 in the draft members 10.

The operation is as follows.

It will be noted that in normal position of the parts as shown in Fig. 1, the rear wall 15 of the combined friction shell and spring casing is spaced from the rear stops 11—11. This space may be varied as desired but in actual practice will preferably equal one-half of the total movement of the gear. Upon inward movement of the draw-bar, rear key 24 will remain stationary, since it is in engagement with the rear ends of the slots 25, and consequently, the follower 19 will remain stationary. The elongated slots 23 in the spring casing, however, will permit the latter with the friction shoes and wedge to move rearwardly without actuating the friction mechanism but compressing the spring 20 between the shoes and the follower 19. This spring action continues until the rear wall 15 engages the stops 11, whereupon the friction cylinder will remain stationary and continued inward movement of the draw-bar will actuate the friction mechanism against the action of the spring 20. In draft, upon forward movement of the draw-bar the links 28 will be moved forwardly, thus imparting a similar movement to the rear key 24 and follower 19. Due to the friction between the shoes and the shell 13, the latter will not move forwardly at this time but instead will remain stationary so that the spring 20 is compressed between the follower 19 and the friction shoes 16. This action continues until the key 24 engages the forward ends of the slots 23, whereupon the spring casing and friction shell are moved forwardly, thus actuating the friction mechanism which is held against movement by the front follower 26.

Various changes and modifications may be made in the details of construction and arrangement of parts without departing from the spirit of the invention, and all such changes and modifications are contemplated as come within the scope of the claims appended hereto.

I claim:

1. In a draft rigging, the combination with a friction shell having friction elements coöperable therewith, and a spring within said shell, a follower within said shell, the spring being interposed between said follower and said friction elements, and a key extending through said shell and follower, said shell being slidable with respect to the said key when the gear is actuated in one direction, while the key remains stationary.

2. In a friction draft rigging, the combination with draft members having front and rear stops mounted thereon, of a friction shell and casing between said draft members, friction elements coöperating with the shell, a spring within said casing, a follower at the end of the gear adjacent the friction elements, said follower normally engaging the stops adjacent thereto, and a key extending transversely through the casing near the opposite end of the gear, the end of the casing adjacent said key being normally spaced from the adjacent stop members, the shell or casing being slidable relatively to said key during a part only of the action of the gear.

3. In a draft rigging, the combination with draft members having front and rear stops secured thereto, of a combined friction shell and spring casing, friction elements coöperating with said shell, a front follower, a spring within said casing, a follower within said casing, a key extending transversely through said casing and slidable in slots in the draft members, the rear end of said casing being normally spaced from the rear stops, the slots within the casing being elongated to thereby permit the casing to slide during a portion of the action of the gear relatively to said key.

In witness that I claim the foregoing I have hereunto subscribed my name this 4th day of October, 1915.

JOHN R. MITCHELL.

Copies of this patent may be obtained for five cents each, by addressing the "Commissioner of Patents Washington, D. C."